Nov. 4, 1930.  W. J. McGURTY  1,780,833
METHOD OF PROCESSING FURNACE DUST
Filed April 24, 1928
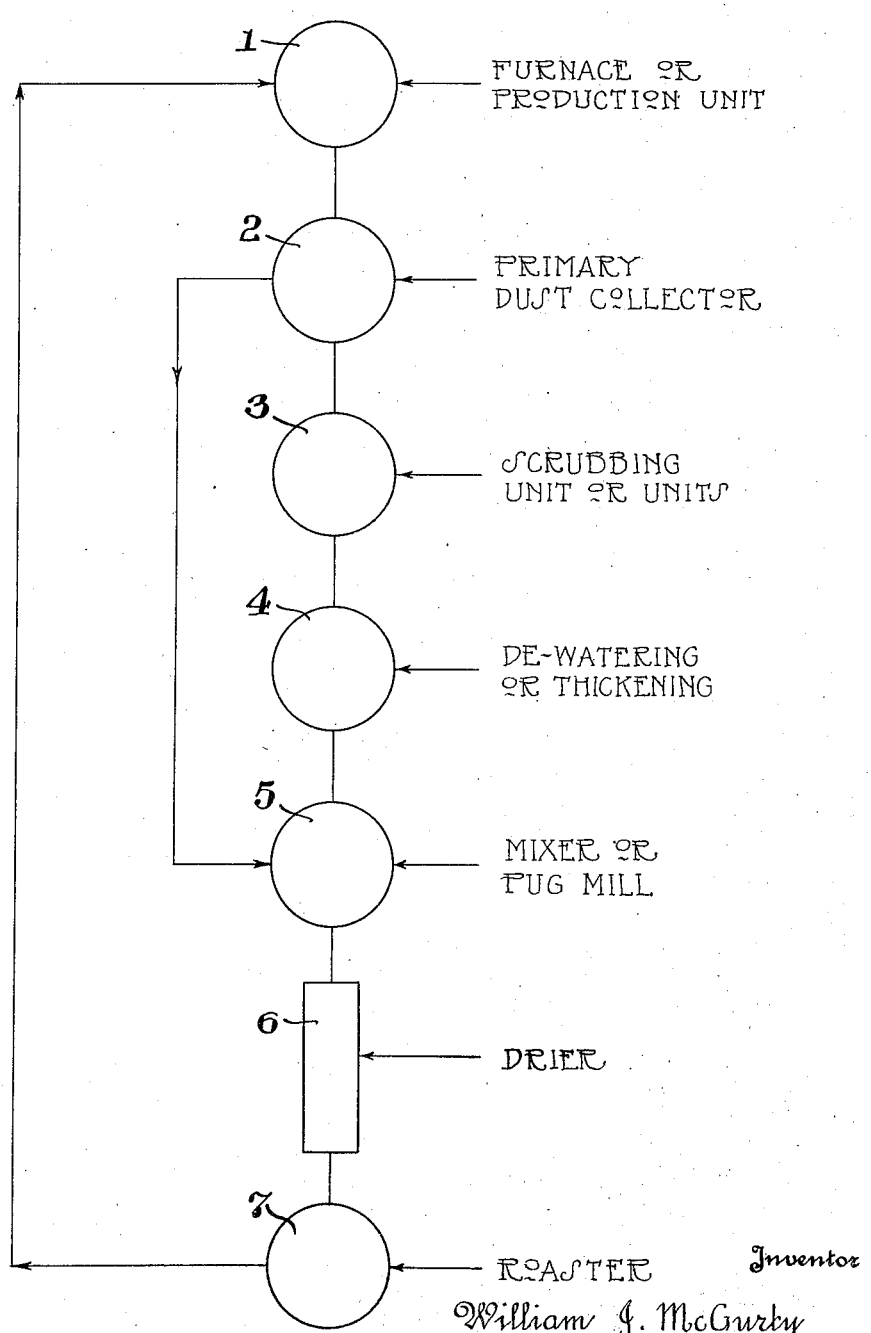

Patented Nov. 4, 1930

1,780,833

UNITED STATES PATENT OFFICE

WILLIAM J. McGURTY, OF BALTIMORE, MARYLAND, ASSIGNOR TO THE BARTLETT HAYWARD COMPANY, OF BALTIMORE, MARYLAND, A CORPORATION OF MARYLAND

METHOD OF PROCESSING FURNACE DUST

Application filed April 24, 1928. Serial No. 272,545.

This invention pertains to the treatment of blast furnace gases and has for its object the production of a process whereby the solids carried by the gas emanating from the furnace will be continuously recovered and so treated that they may be returned to the furnace in a clinkered condition ready for use.

The present methods of handling the dusts produced in the manufacture of iron products in the blast furnace, such as pig iron, ferromanganese, spiegeleisen or kindred products, are unsatisfactory in that the final product is not in a condition for satisfactory or efficient utilization owing to inadequate mixing.

In the usual and heretofore existing processes the dust emanating from the furnace or other production equipment first enters a collection chamber commonly known as the dust catcher from which the dust is removed in a dry or partially wetted condition.

Such material after its proper conditioning is, in some plants, put through a clinkering or a sintering process as a means of securing its economical utilization in the production unit from which it was originally discharged.

The dust products remaining in the gas leaving the dust catcher are usually recovered in scrubbing equipment of various types in the form of sludge or slurry containing from 0.5% to 4.0% of solids.

It is necessary to effect a substantial dewatering of this material before it can be utilized in the present, existent "clinkering" or "sintering" processes and up to the present time, so far as I am aware, such processing has not been continuous or complete in view of the practical impossibility of securing satisfactory admixture.

Under my invention as hereinafter set forth there is provided a complete process for the handling of all or part of the dust products issuing from the production unit of pig-iron and the kindred products hereinbefore specified.

The invention will be best understood upon reference to the annexed drawing wherein a flow sheet is shown depicting my method and the various pieces of apparatus that may be employed in carrying out the same.

In said drawing 1 denotes the furnace or production unit from which the dust laden gas passes to a primary dust collector 2 from which it passes in part in a partially wetted or dried condition to a scrubbing unit (or units) 3, thence to a dewatering or thickening apparatus 4 which may be either of static or mechanical type with a view of securing a suitable concentration of the solid content of the sludge or slurry. It then passes into a mixer or pug mill 5 in the form of sludge or slurry where it is admixed with a quantity of the dry or partially wetted product passing directly from the primary dust collector 2.

The material thus admixed is fed to a continuous drier 6 in which it is dewatered sufficiently for satisfactory treatment in a roaster 7 to which the material is delivered from the drier.

From the roaster the material is returned to the furnace or production unit in the form of a sintered mass which insures its economical utilization in the furnace.

It is conceivable that the roaster, as such, may be omitted, provided there is present within the drier a supply of sufficient calorific values to effect a partial or complete roasting operation. In such case, of course, the drier would discharge directly into the furnace or production unit and not to a roaster.

It is to be understood, of course, in connection with the primary dust collector 2 that the solids which are removed do not pass to the scrubber and dewatering units 3 and 4 but are by-passed with reference to those elements and finally introduced into the mixer or pug mill 5 along with the other solids in the form of sludge or slurry which have been removed from the gas by the elements 3 and 4.

What is claimed is:

1. That method of processing solids carried by gases emanating from a furnace which consists in discharging the gas into a dust collector and therein arresting a portion at least of the solids carried by the gas; passing the gas thus partially cleaned through a scrubbing unit wherein the gas is washed and a further recovery of solids is effected; dewatering the solids thus recovered; admixing such material with the solids removed by the dust collector; and then drying the mass.

2. That method of processing solids carried by gases emanating from a furnace which consists in discharging the gas into a dust collector and therein arresting a portion at least of the solids carried by the gas; passing the gas thus partially cleaned through a scrubbing unit wherein the gas is washed and a further recovery of solids is effected; dewatering the solids thus recovered; admixing such material with the solids removed by the dust collector; and then drying and roasting the mass preparatory to its return to the furnace unit.

In testimony whereof I have signed my name to this specification.

WILLIAM J. McGURTY.